Nov. 3, 1964 J. C. SCHINDLER 3,155,430
CHROMATIC WHEEL COVER
Filed Dec. 6, 1962
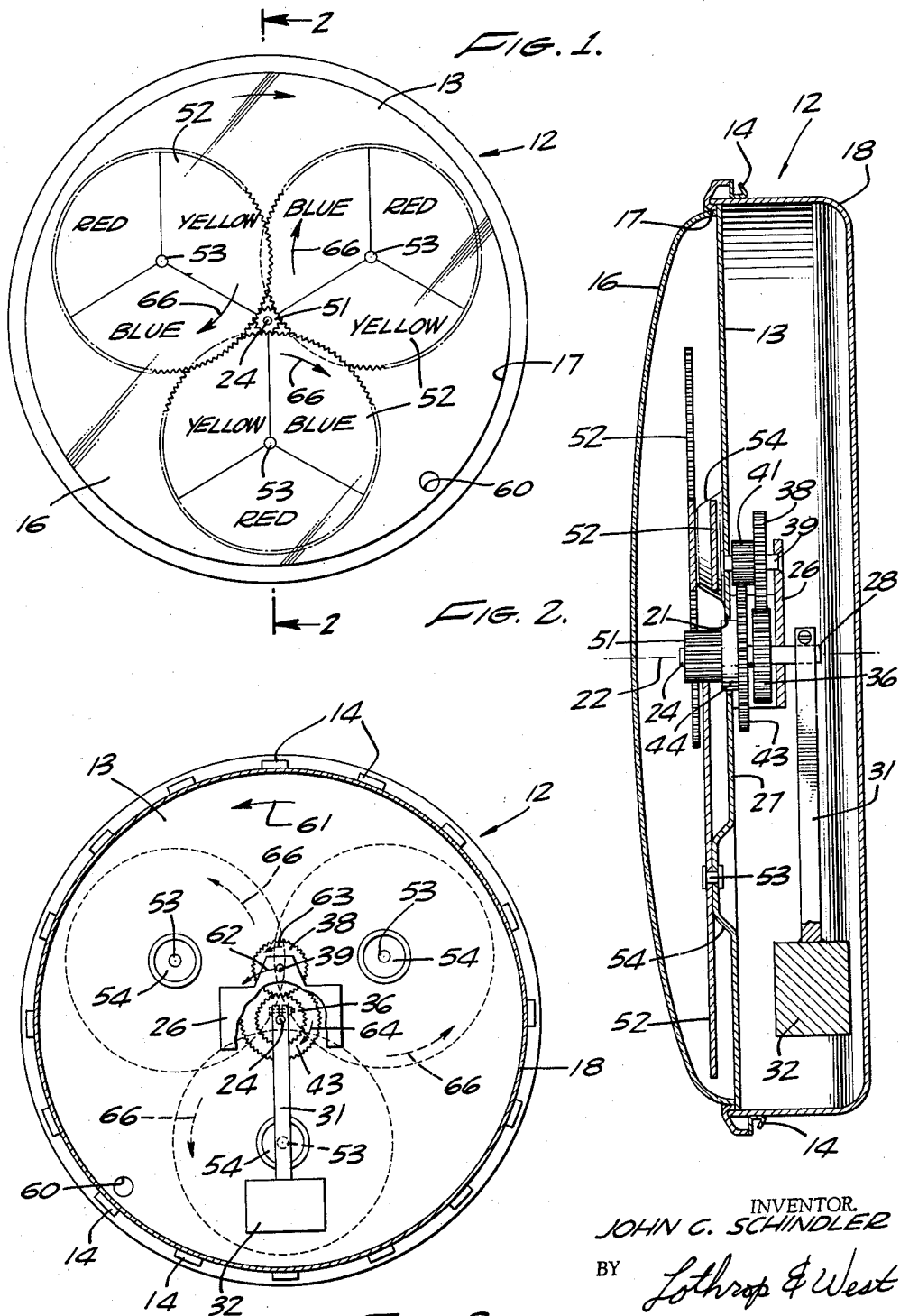
INVENTOR.
JOHN C. SCHINDLER
BY Lothrop & West
ATTORNEYS

United States Patent Office 3,155,430
Patented Nov. 3, 1964

3,155,430
CHROMATIC WHEEL COVER
John C. Schindler, Sacramento, Calif.
(701 W. St. Joseph St., Perryville, Mo.)
Filed Dec. 6, 1962, Ser. No. 242,697
1 Claim. (Cl. 301—37)

The invention relates to wheel covers and, more particularly, to colored wheel covers.

It is an object of the invention to provide a cover for a vehicle wheel and which continuously changes color as the wheel rotates.

It is another object of the invention to provide a chromatic wheel cover which is readily attachable to the wheel of a vehicle, such as an automobile, and which serves to protect the adjacent axle portion of the wheel from dust and moisture.

It is another object of the invention to provide a generally improved color changing hub cap.

Other objects, together with the foregoing, are attained in the embodiment described in the following description and shown in the accompanying drawings in which:

FIG. 1 is a front elevational view;

FIG. 2 is a diametral section, the plane of the section indicated by the line 2—2 in FIG. 1; and FIG. 3 is a rear elevational view, portions of the figure being broken away to reveal underlying structure.

While the wheel cover of the invention is susceptible of numerous physical embodiments, depending on the environment and requirements of use, substantial numbers of the herein shown and described embodiment have been made and used, and have performed in an eminently satisfactory manner.

The wheel cover of the invention, generally designated by the reference numeral 12, comprises a planar circular disk 13 provided with a plurality of peripherally located spring clips 14 for attachment, in conventional manner, to the wheel of a vehicle, such as an automobile.

Serving to protect the outer face of the disk is a transparent cap 16 lodged in and against an annular shoulder 17 formed around the periphery of the disk 13. If desired, the cap can be permanently secured in place by the use of an appropriate adhesive, such as epoxy resin. Although it is not essential, an inner protective cover 18 can also be utilized.

Formed in the center of the circular disk 13 is a circular opening 21 through which extends, coaxially with the rotational axis 22 of the disk, a shaft 24, the inner portion of the shaft being journalled in a bracket 26 mounted on the inner face 27 of the disk 13.

Secured to and depending from the inner end 28 of the shaft 24 is an arm 31 having a weight 32 secured thereto, the weight being sufficient to maintain the arm 32 in a vertical attitude even though the disk rotates along with the vehicle's wheel to which the disk is attached.

In other words, the force of gravity, acting on the weight, causes the shaft 24 to remain angularly fixed. Likewise angularly immobile is a fixed gear 36 mounted coaxially on the shaft 24.

In meshing engagement with the fixed gear 36 is a first revolving gear 38 mounted coaxially on an axle 39 journalled in the bracket 26 and the disk 13.

As the vehicle wheel and the disk 13 rotate, the axle 39 is revolved about the fixed shaft 24, the first revolving gear 38 being concurrently revolved about the fixed gear 36 and being rotated thereby about the axis of the axle 39.

A second revolving gear 41 is mounted coaxially on the axle 39 and is secured to the first revolving gear 38, the second gear 41 being preferably considerably smaller in diameter than the first gear 38.

In meshing engagement with the small second revolving gear 41 is a substantially larger pinion, termed a first rotating gear 43 journalled for rotation on the fixed shaft 24. Secured to the outer face of the gear 43 is an annular flange 44 disposed within and projecting through the circular opening 21 with but a slight amount of clearance, the opening's walls thereby serving to center the flange 44.

The combined revolving and rotating motions of the small second revolving gear cause the large first rotating gear 43 and the flange 44 to rotate at quite a low speed about the fixed shaft 24. This same slow angular movement is also imparted to a second rotating gear 51 mounted on the outer face of the flange 44 and being similarly rotatable about the fixed shaft 24.

Finally, the second rotating gear 51 is disposed in meshing engagement with a plurality (preferably three, spaced 120 degrees apart) of toothed color disks 52, each of the color disks being mounted on an axle 53 journalled on an outwardly projecting button 54 formed in the disk 13.

As appears most clearly in FIG. 1, each of the color disks 52 is preferably divided into three equal sectors having the primary colors red, yellow and blue appearing thereon. It is to be noted, however, that any other arrangement of colors could be used.

In installing the device on a vehicle wheel, the disk is angularly oriented so that the valve stem on the wheel projects outwardly through the opening 60.

Assuming that the vehicle's wheel travels in a direction such as to rotate the disk in the angular direction indicated by the arrow 61, it can be seen that the axle 39 and the first revolving wheel 38 are revolved about the fixed shaft 24 in the direction indicated by the arrow 62. Concurrently, the first revolving gear 38, in "walking" around the fixed gear 36 (see FIG. 3), is caused to rotate in the direction indicated by the arrow 63.

Angular movement in the direction of the arrow 63 is also shared by the small second revolving gear 41 (see FIG. 2) which is in engagement with the large first rotating gear 43. The proportions of the gear diameters are selected so that a very slow angular movement in the direction of the arrow 64 is imparted to the first rotating gear 43, this same motion also being imparted to the second rotating gear 51.

Since the toothed color disks 52 are much larger in diameter than the slowly rotating gear 51, it can be seen that the color disks rotate very slowly about their individual axes, and in the direction indicated by the arrows 66.

Rotation of the wheel cover at high speed, about the axis 22, causes the colors in the disks to blur into circular bands of colors of various shades. Then, as the color disks continuously rotate about their own axes, the circular bands of color continuously shift inwardly and outwardly and, at the same time, change in hue.

It can therefore be seen that a constantly shifting pattern of colors is provided which particularly lends itself to use on vehicle wheels, such as on automobiles, amusement park devices, children's wagons and related equipment.

What is claimed is:

A color changing attachment to a motor vehicle wheel comprising:

(a) a circular mounting disk including means for mounting said disk in a vertical attitude on the outside of a motor vehicle wheel for rotational movement therewith;

(b) an imperforate transparent cap mounted on the outside of said disk;

(c) a plurality of colored disks rotatably mounted on the outer surface of said mounting disk and being revolved thereby as said disk rotates with the wheel;

(d) a horizontal shaft rotatably mounted on the axis of rotation of said mounting disk, said shaft and said mounting disk being relatively angularly movable with respect to each other;

(e) an arm having its proximal end mounted on the inner end of said horizontal shaft, said arm depending in a vertical direction and including at its lower end a weight adapted gravitationally to hold said arm in a substantially vertical attitude and thereby to restrain said horizontal shaft against rotational movement relative to said disk and said wheel; and, (f) means connecting said horizontal shaft, said mounting disk and said colored disks for rotating said colored disks at an angular velocity dependent upon the relative angular movement between said disk and said wheel on the one hand and said horizontal relatively fixed shaft on the other hand.

References Cited in the file of this patent
UNITED STATES PATENTS

| | | |
|---|---|---|
| 751,086 | Lynn | Feb. 2, 1904 |
| 1,832,605 | Zallio | Nov. 17, 1931 |
| 2,830,473 | Brown | Apr. 15, 1958 |
| 2,841,920 | Balleis | July 8, 1958 |
| 2,997,344 | Whiteman | Aug. 22, 1961 |
| 3,050,888 | Myers et al. | Aug. 28, 1962 |